Nov. 9, 1965  R. J. BIBBERO ETAL  3,216,311
NON-CONTACTING OBJECT MEASURING APPARATUS
Filed March 29, 1961  3 Sheets-Sheet 2
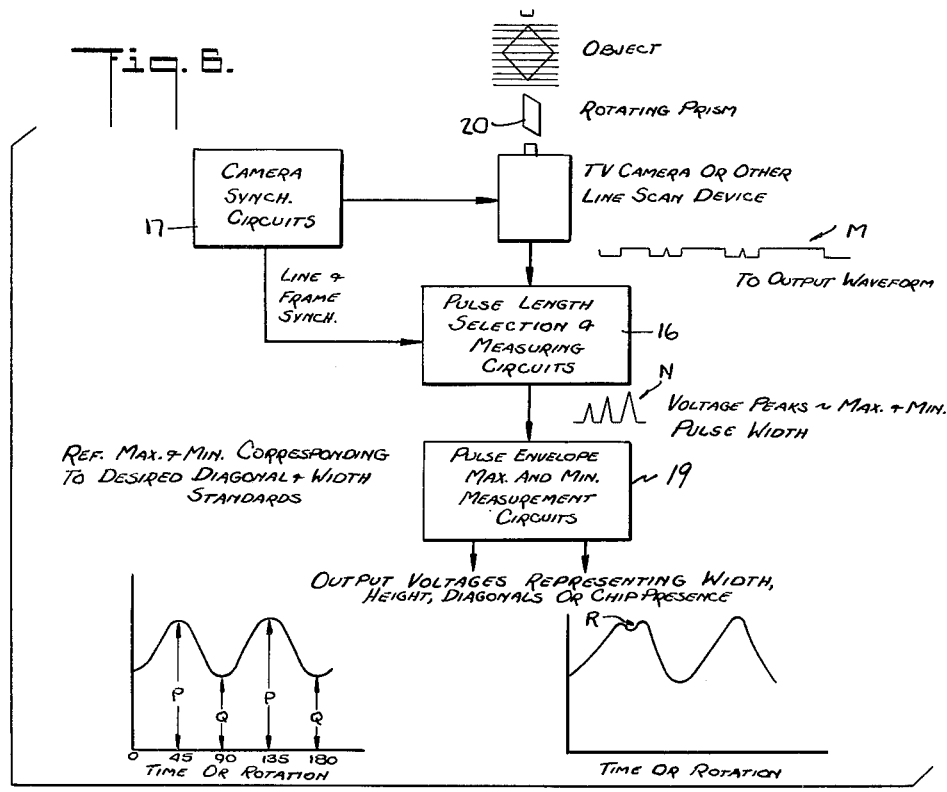
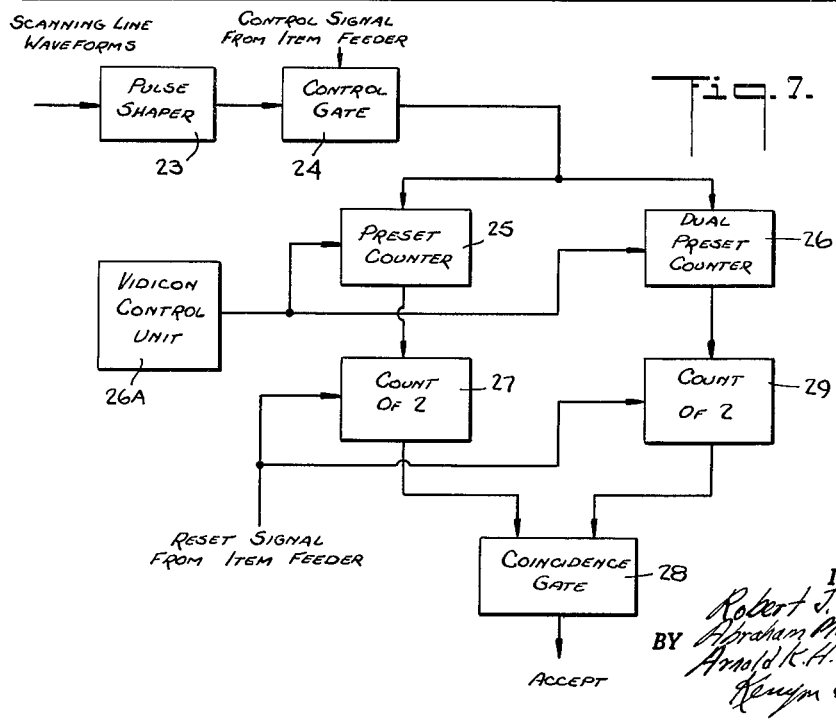
INVENTORS
Robert J. Bibbero
BY Abraham Marx and
Arnold K.H. Goldberger
Kenyon & Kenyon
ATTORNEYS Nov. 9, 1965 R. J. BIBBERO ETAL 3,216,311
NON-CONTACTING OBJECT MEASURING APPARATUS
Filed March 29, 1961 3 Sheets-Sheet 3

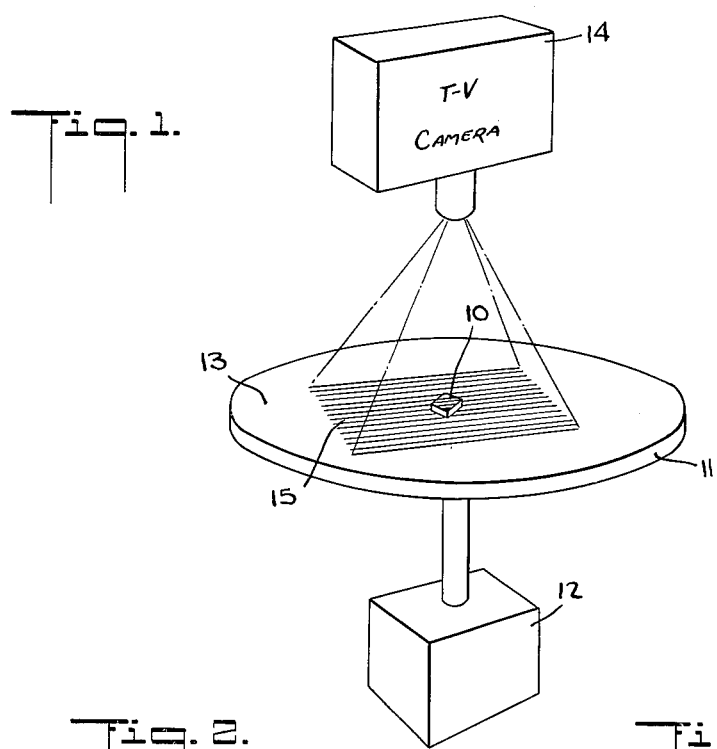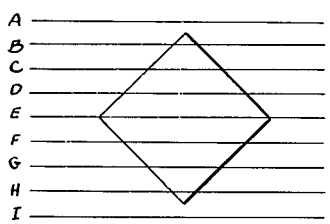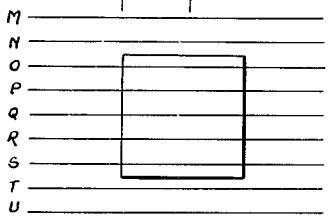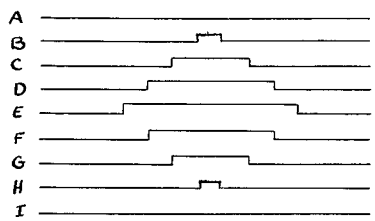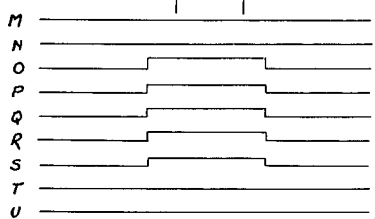

INVENTORS
Robert J. Bibbero
Abraham Mann and
Arnold K. H. Goldberger
BY
Kenyon & Kenyon
ATTORNEYS

United States Patent Office 3,216,311
Patented Nov. 9, 1965

3,216,311
NON-CONTACTING OBJECT MEASURING
APPARATUS
Robert J. Bibbero, Great Neck, Abraham Mann, Uniondale, and Arnold K. H. Goldberger, Great Neck, N.Y., assignors to Bulova Research and Development Laboratories, Inc., Woodside, N.Y., a corporation of New York
Filed Mar. 29, 1961, Ser. No. 99,281
6 Claims. (Cl. 88—14)

The present invention relates generally to inspection devices and more particularly to a method and apparatus for sizing and measuring very small and delicate objects without physically contacting, handling or accurately locating these objects.

Conventional methods of measuring and inspecting very small objects, such as germanium transistor dice, entail certain difficulties. Calipers and the like require extreme care in manipulation when applied to such objects, which in the case of germanium transistor dice may be approximately .02 x .02 inches square. There are known methods which do not require physical contact of the objects with the measuring of inspection device, as for example, optical methods employing projection of the object's shadow against a reference pattern. However, such methods require exact orientation of the item to be inspected. Where delicate or very small objects, such as germanium transistor dice, are inspected by existing direct or indirect methods, the requisite handling or positioning is liable to result in damage to the objects.

Accordingly, it is the main object of this invention to provide a technique and apparatus for inspecting and measuring objects without handling or contacting these objects, and without the need to orient or accurately locate the object.

It is another object of this invention to provide a system for measuring objects which is adaptable to automatic accept and reject mechanisms.

It is another object of this invention to provide a system for measuring the size and detecting defects in objects which operates with greater speed than systems previously known.

Briefly stated, these and other objects of the invention are accomplished by rotating the object to be inspected anywhere in the field of a line scanning device, preferably a television camera incorporating a vidicon or orthicon for example as the camera tube. It is not necessary to rotate the object around its own center as long as the object remains within the field of the scanning device. The line scanning device produces an output which is a series of waveforms, termed a raster in television. Each waveform (or line in the raster) represents a different line in the field containing the inspected object. Therefore each waveform will be modulated proportionately to the linear element of the inspected object in the line scanned by that waveform. One complete series of waveforms (a complete raster) produces a picture, built up line by line, of the object.

As the object is rotated in the scanning field, successive pictures of the item are produced, each picture consisting of a series of waveforms representing separate lines traversing the object. Out of all the pictures produced, the scanning line producing the waveform with the longest modulation represents a diagonal of the object. Similarly, if out of each picture produced the waveform with the longest modulation is selected, the minimum modulation length among these selected waveforms represents the length of a side of the object.

Out of each picture produced the waveform with the longest modulation is selected. The maximum modulation length from among these selected waveforms represents a diagonal of the object. The minimum modulation length form among these selected waveforms represents a side of the object. Comparison of these minimum and maximum modulation lengths with a standard can be used to accept or reject the object for oversize or undersize or corner chips.

For a better understanding of the invention as well as other objects and features thereof reference is made to the following detailed description to be read in conjunction with the accompanying drawings, in which:

FIG. 1 is a perspective view of an apparatus for sizing and inspecting very small objects.

FIG. 2 is an enlarged plan view of a diagonally-oriented square object on the inspecting turntable, with scanning lines of the inspecting field shown superimposed upon the object.

FIG. 3 represents modulated waveforms of the scanning lines obtained from diagonal orientation of the inspected object to the scanning field.

FIG. 4 is an enlarged plan view of an orthogonally oriented square object on the inspecting turntable, with scanning lines of the inspecting field shown superimposed upon the object.

FIG. 5 represents waveforms of the scanning lines obtained from orthogonal orientation of the inspected object to the scanning field.

FIG. 6 is a diagram of the inspection system adapted to object measurement using the maximum-modulation method.

FIG. 7 is a block diagram of a circuit arrangement adapted to effect square object acceptance using the modulation-count method.

Figure 8:
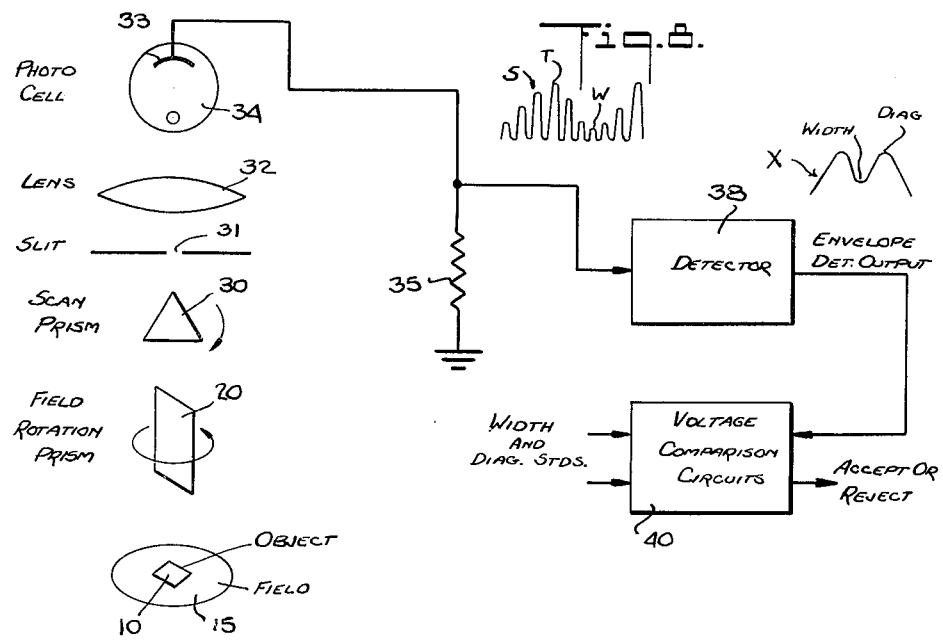
FIG. 8 is a diagram of the inspection system adapted to an optical-mechanical method of line-by-line scanning.

Referring now to FIG. 1, an object 10 is placed upon a rotating turntable 11, driven by a motor 12. The surface 13 of turntable 11 should present as much of an optical contrast as possible with object 10. The object 10 is shown as presenting a square surface and the invention is particularly useful in inspecting square, rectangular and parallelogram surfaces. However the invention can be used to inspect any shaped surface. Scanning viewer 14, which in this preferred embodiment is a television camera having a one inch vidicon picture tube, has a scanning field 15 which includes the object 10 to be scanned.

The image of area 15 which appears inside the television camera is scanned continuously by a moving spot whose trace or trajectory is a series of closely spaced parallel straight lines, as in conventional television practice. The trajectory of the moving spot is termed a raster. This raster is shown in the scanning field 15 as a projection of the actual raster in the vidicon. FIGURE 1 illustrates only a relatively few raster lines to aid visualization. In a typical situation the scanning area 15 may be 0.375 inch by 0.5 inch and the objects to be scanned germanium transistor dice approximately 0.02 inch square. The raster is composed of several hundred lines so that small objects within the scanning field 15 are adequately discriminated.

As turntable 11 rotates, the object 10 describes a circular path so that the angular relation between the dimensions (sides and diagonals) of the object and the raster lines continuously varies. At some point during the rotation of object 10 in scanning field 15, a raster line will very nearly coincide with a diagonal of the object 10. Scanning line E' in FIG. 2 illustrates such a condition. The modulated waveforms of the scanning lines of FIG. 2 are shown in FIG. 3, it being realized that not all the scanning lines can be shown in an illustration of this size.

At another point in the rotation of turntable 11, object 10 will be aligned, as in FIG. 4, so that opposing parallel sides will be perpendicular to the raster lines. The corresponding waveforms of the modulated lines are shown in FIG. 5.

The television camera output is composed of a series of modulated lines such as those shown in FIGS. 3 and 5. This output (partially shown as M in FIG. 6) is fed to a pulse length selection and measuring circuit 16 shown in block form in FIG. 6.

The pulse length selection and measuring circuit 16 selects the scanning line with the longest pulse out of each complete raster of scanning lines. Thus if there are 300 lines in one raster, the pulse length selection and measuring circuit selects the longest pulse out of each 300 successive lines. A camera synchronization circuit 17 is needed to inform the pulse length selection and measuring circuit 16 of the end of each raster sweep so that said circuit 16 will release the longest pulse received during the preceding raster sweep and be ready to start on the next raster.

Thus the output N of the pulse length selection and measuring circuit 16 is a series of output pulses, one pulse for each raster sweep, each pulse being proportional to the length of the longest modulation during the raster sweep represented by that pulse. That is to say, each raster sweep produces for the scanning lines making up the raster, a train of pulses of varying widths or duration. The circuit 16 effectively converts this train of duration-modulated pulses into a single output pulse whose peak level is determined by the pulse of maximum duration in the train. In its simplest form, the circuit 16 need be nothing more than a conventional duration-modulation pulse demodulator which integrates the train of duration-modulated pulses from the television camera to produce one output pulse for each raster sweep, the height of the output pulse reflecting the length of the pulse of longest duration in the input train. The camera synchronization circuit at the end of each raster sweep acts effectively to discharge the integration circuit of the demodulator to prepare it for the next raster sweep. The output N of the pulse length selection and measuring circuit 16 is fed to a pulse envelope maximum and minimum measurement circuit 19. The maximum output pulse from circuit 16 corresponds to the diagonal of the object 10 being inspected. The minimum output pulse from circuit 16 corresponds to the length of a side of the object 10 being measured.

Pulse envelope maximum and minimum measurement circuit 19 is calibrated for each class of objects being inspected so that a reference is established against which the maximum and minimum output pulse from circuit 16 can be compared.

The graphs in FIG. 6 illustrate the envelope of the input N, to pulse envelope maximum and minimum measurement circuit 19. In FIG. 6, P represents a diagonal and Q represents a side. A corner chip defect is shown at R.

The embodiment described rotates the object 10 within the scanned field. As indicated in FIG. 6, a field rotation prism 20 such as the Dove prism may be placed between the object 10 and the television camera 14. By rotating the prism 20 the image of the object 10 will rotate with respect to the raster and it is not necessary to actually rotate the object 10. The crux of the invention is the relative rotation between the object image and the scanning locus of a line scanning device. Manifestly many embodiments are possible of the invention. In the discussion of all embodiments and claims it is to be understood that reference to image rotation shall include rotation of the object.

Under the embodiment described the modulated lengths of the scanning lines must be measured under conditions of rapid scanning. Scanning speed may be 0.002 inch per microsecond. At that speed, to obtain one percent accuracy, modulation lengths must be detected within 0.1 microsecond. An alternate method of measuring the diagonals and sides of the object 10, eliminates the necessity for measuring the modulated lengths.

In this alternate method, instead of measuring the diagonal parallel to the scanning lines, the diagonal at right angles to the scanning lines is measured. This diagonal measurement is accomplished by counting the number of scanning lines coinciding with any portion of object 10 and recording the maximum number of lines so coinciding throughout the rotation of object 10. In FIGS. 2 and 3, it may be seen that lines B through H fall on portions of the object 10 and modulations are produced in those lines thereby. When a diagonal of object 10 is oriented at right angles to the scanning lines, object 10 intersects the maximum number of scanning lines. The scanning lines producing modulations for each complete scan of object 10 are counted, the maximum count detected and compared with the standard reference count representing the expected diagonal length.

To detect the side length of object 10, the number of modulated scanning lines is monitored for a minimum count over a complete rotation of object 10. It may be seen from FIGS. 4 and 5 that a minimum number of scanning lines fall over portions of object 10 when sides of object 10 are at right angles to the linear scanning lines. The detected minimum count is compared to a standard reference count representing the expected side length of object 10.

FIG. 7 shows the block diagram of logic circuitry that may be used in conjunction with the modulation counting method of inspection of square objects. In this application, the conditions for acceptance are that the side dimensions are within a given tolerance and that corner chips are no larger than a given value. The output of the vidicon scanning device is supplied to pulse shaper 23. Pulse shaper 23 sharpens the modulation to discriminate between scanning lines having modulated waveforms and those that do not. Each new item to be inspected causes the control signal from the items mechanical feeder to clear control gate 24, so that pulses are passed on to the present counters 25 and 26. Preset counter 25 is set to produce an output if a certain number of pulses are counted over a scanning period. The scanning period is identified by a signal from vidicon control unit 26. If the required number of pulses are counted, indicating the corresponding diagonal is of sufficient length, an output is sent to count of 2 gate 27. If both diagonals are of correct length, count of 2 gate 27 receives 2 inputs and sends an output to coincidence gate 28.

Similarly, dual present counter 26 is controlled to count over a scanning period. This counter only produces a pulse output when the value of the input count is between a lower and upper limit. When the desired number of lines have produced modulated waveforms, an output is sent to count of 2 gate 27, indicating the inspected side is of correct length. Two such outputs, indicating both parts of sides are correct, causes count of 2 gate 29 to send an output to coincidence gate 28. When both gate 24 and gate 29 have produced outputs to coincidence gate 28, indicating all item dimensions are correct, gate 28 sends an acceptance signal to the feeder mechanism. The count of 2 gates 27 and 29 are then cleared for the next inspection operation.

This scanning line count method, like the scanning line modulated length method, depends on the relative rotation between the object image and the scanning locus of a line scanning device. Therefore a field rotation prism 20 such as the Dove prism may also be incorporated in this scanning line method in place of the rotating turntable.

A third embodiment of the invention incorporates an optical-mechanical arrangement to replace the television camera. Referring to FIG. 8, the object 10 is located in the scanning field 15. As in the other embodiments a field rotation prism 20 is preferred to effect image rotation. A scan prism 30 and an optical slit 31, in conjunction, effect linear scanning of the rotating image. The scan prism 30 reflects the image onto the surface that includes the slit 31. By rotating the scan prism 30 on an axis parallel to the slit, the scan prism displaces the image relative to the slit 31, thereby effecting a scan of the image by the slit. The scan prism 30 rotation rate is substantially greater than the field prism 20 rotation rate so that during each complete scan the object 10 image rotation is slight.

A lens 32 focuses the image slice that comes through the slit 31 onto the cathode 33 of a phototube 34. The phototube 34 output is directly related to the amount of light falling on the cathode 33. The output across a resistor 35 will have the general characteristics shown by the waveform S in FIG. 10. The carrier frequency in waveform S is a direct function of the scan prism 30 rotation rate. The modulation rate is a direct function of the field prism 20 rotation rate.

When the image position in the field is such that a diagonal is parallel to the slit 31, the carrier signal will display its greatest excursion, T, which excursion will represent at its peak point the instant when the scan prism has brought the image of the parallel diagonal into the plane defined by the slit line 31 and the focal point of the lens 32. Similarly, the carrier signal will display its minimum excursion W when the image in the field is such that a side is parallel to the slit.

The phototube 34 output is fed to a detector 38 to produce the output envelope having the general characteristics shown by waveform X. The maximum height of envelope waveform X represents a diagonal and the minimum height represents a side. The output X is then fed to voltage and comparison circuit 40 for comparison with earlier calibrated width and diagonal standards. The voltage and comparison circuit produces an accept or reject signal for the operator. Alternatively, the accept or reject signal may be adapted to automatic inspection by actuating accept and reject mechanisms associated with the object feed mechanism.

Although the invention has been described with a certain degree of particularity and three major modes of operation have been illustrated, it is to be understood that the present disclosure is by way of example and that changes in the details of construction and operation will be apparent to one skilled in the art and can be made without departing from the scope and claims of the invention.

Figures 9, 10:
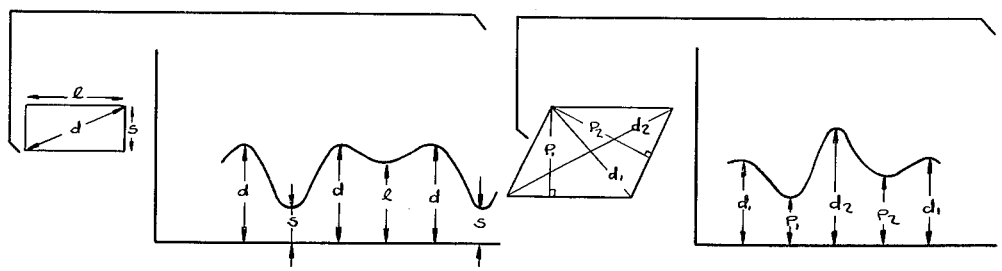
FIG. 9 is the modulation envelope for a rectangular object.
FIG. 10 is the modulation envelope for a parallelogram shaped object.
Figure 11:
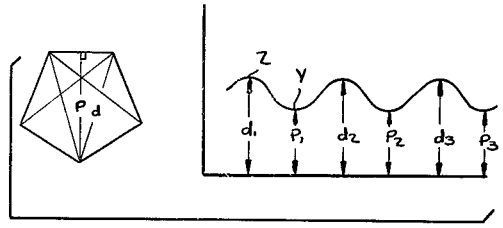
FIG. 11 is the modulation envelope for a regular pentagon.

For example, the illustrations all show the application of the invention to a square object. The invention is just as useful for inspecting objects having rectangular, parallelogram and circular surfaces. The modulation envelope for a rectangular object would be as shown in FIG. 9 and the modulation envelope for a parallelogram shaped object would be as shown in FIG. 10. With modifications only of the logic of the acceptance and rejection circuitry any known shape can be checked for dimensions. FIG. 11 illustrates the modulation envelope that would be obtained in checking a regular pentagon. In FIG. 11, Z indicates a corner-to-corner dimension and Y indicates a perpendicular from corner to opposing edge. If the object is known to be a regular pentagon, dimensions Z and Y completely define the object's size. An estimate of regularity can also be made by comparing successive peaks Z and successive troughs Y. If the ratio of the largest Z to the smallest Y exceeds a certain amount the object can be rejected for irregularity. Thus the invention is readily adaptable to inspection of a wide range of objects.

Similarly, though a phototube is incorporated in the optical-mechanical embodiment of the invention, any photoelectric device may be used. Certainly the electronic circuitry, which is shown in the various embodiments in block form, may be considerably varied and made more or less complex to meet the needs of automation, mass inspection or more sensitive control. The envelope detected by the circuits in FIGS. 6 or 8 may be presented on a display tube for visual inspection and comparison with a standard modulated waveform or peaks and troughs may be electronically measured and compared with standards for an automatic indication of acceptance or rejection.

It is intended therefore in the appended claims to cover all such modifications as fall within the true scope of the invention.

What is claimed is:

1. A system for inspecting small objects, comprising means for rotating an image of said object, scanning means cyclically to make repeated rapid linear scans of said rotating image whereby each cycle of scans is representative of the image at a particular angular position in the course of a rotation thereof, means responsive to the linear modulations occurring during each cycle of scans to produce a pulsatory wave whose amplitude represents the maximum of said modulations in said cycle, and means for deriving the envelope of the pulsatory waves produced during the rotation of said image to produce indicia representative of the dimensions of said object.

2. An inspection system, as set forth in claim 1, wherein the means for rotating the image of said object is a rotating field rotation prism disposed between said object and said scanning means.

3. An inspection system, as set forth in claim 1, wherein said means to rotate said image is constituted by a turntable.

4. An inspection system, as set forth in claim 1, wherein the scanning means is a television camera.

5. An inspection system, as set forth in claim 1, wherein the scanning means comprises a plate containing an optical slit and a scan prism rotating along an axis parallel to said optical slit, said scan prism disposed between said means for rotating said image and said plate so as to continuously variably displace said rotating image relative to said slit.

6. A system as set forth in claim 1, further including means to compare the indicia representative of the dimensions of the inspected object with reference indicia to produce an indication of whether the dimensions of the inspected object are acceptable.

References Cited by the Examiner

UNITED STATES PATENTS

| | | | |
|---|---|---|---|
| 1,647,631 | 11/27 | Ives | 88—1 |
| 2,548,590 | 4/51 | Cook | 88—14 |
| 2,648,723 | 8/53 | Goldsmith | 209—111.5 |
| 2,750,519 | 6/56 | Summerhayes | 209—111.5 |
| 2,789,765 | 4/57 | Gillings | 235—92 |
| 2,891,722 | 6/59 | Nuttall et al. | 235—92 |
| 2,905,318 | 9/59 | Schell | 209—111.5 |
| 3,002,098 | 9/61 | Watkins | 250—203 |
| 3,035,478 | 5/62 | Laycak | 88—14 |
| 3,049,588 | 8/62 | Barnett | 178—6 |
| 3,088,036 | 4/63 | Hobles | 235—92 |

FOREIGN PATENTS 708,347  5/54  Great Britain.

JEWELL H. PEDERSEN, *Primary Examiner.*
ROBERT C. RIORDON, *Examiner.*